US 8,396,603 B2

(12) United States Patent
Savelle, Jr.

(10) Patent No.: US 8,396,603 B2
(45) Date of Patent: Mar. 12, 2013

(54) IRRIGATION CONTROLLER WITH INTEGRATED WIRE TRACKER

(75) Inventor: William C. Savelle, Jr., Mckinney, TX (US)

(73) Assignee: Telsco Industries, Inc., Garland, TX (US)

( * ) Notice: Subject to any disclaimer, the term of this patent is extended or adjusted under 35 U.S.C. 154(b) by 574 days.

(21) Appl. No.: 12/454,455

(22) Filed: May 18, 2009

(65) Prior Publication Data

US 2010/0004789 A1     Jan. 7, 2010

Related U.S. Application Data

(60) Provisional application No. 61/132,312, filed on Jun. 16, 2008.

(51) Int. Cl.
*G06F 19/00*     (2011.01)
(52) U.S. Cl. ........................................ 700/284; 361/160
(58) Field of Classification Search .................. 361/160; 700/284
See application file for complete search history.

(56) References Cited

U.S. PATENT DOCUMENTS

| 5,926,025 | A | * | 7/1999 | Mercer | 324/326 |
| 7,406,363 | B2 | | 7/2008 | Doering | |
| 2007/0035907 | A1 | * | 2/2007 | Doering et al. | 361/160 |

OTHER PUBLICATIONS

Instruction Manual, "521A Wire and Valve Locator", Greenlee, No. 52026703, Oct. 2006.

* cited by examiner

*Primary Examiner* — Michael D Masinick
(74) *Attorney, Agent, or Firm* — Rudolph J. Buchel, Jr.

(57) ABSTRACT

The present invention is directed to an irrigation controller, method and software program product for generating wire tracker signal transmission across a control wire. The irrigation controller includes a valve actuation control module selectively coupled to each of a plurality of control wires and generating a valve actuation control signal thereon. The valve actuation control signal is a continuous control voltage over a plurality of control signal periods for selectively energizing the selected irrigation valve. Also integrated in the irrigation controller is a wire tracker transmitter module for selectively coupling to each of a plurality of control wires and generating a transmission signal that can be received at a mobile receiver.

18 Claims, 10 Drawing Sheets

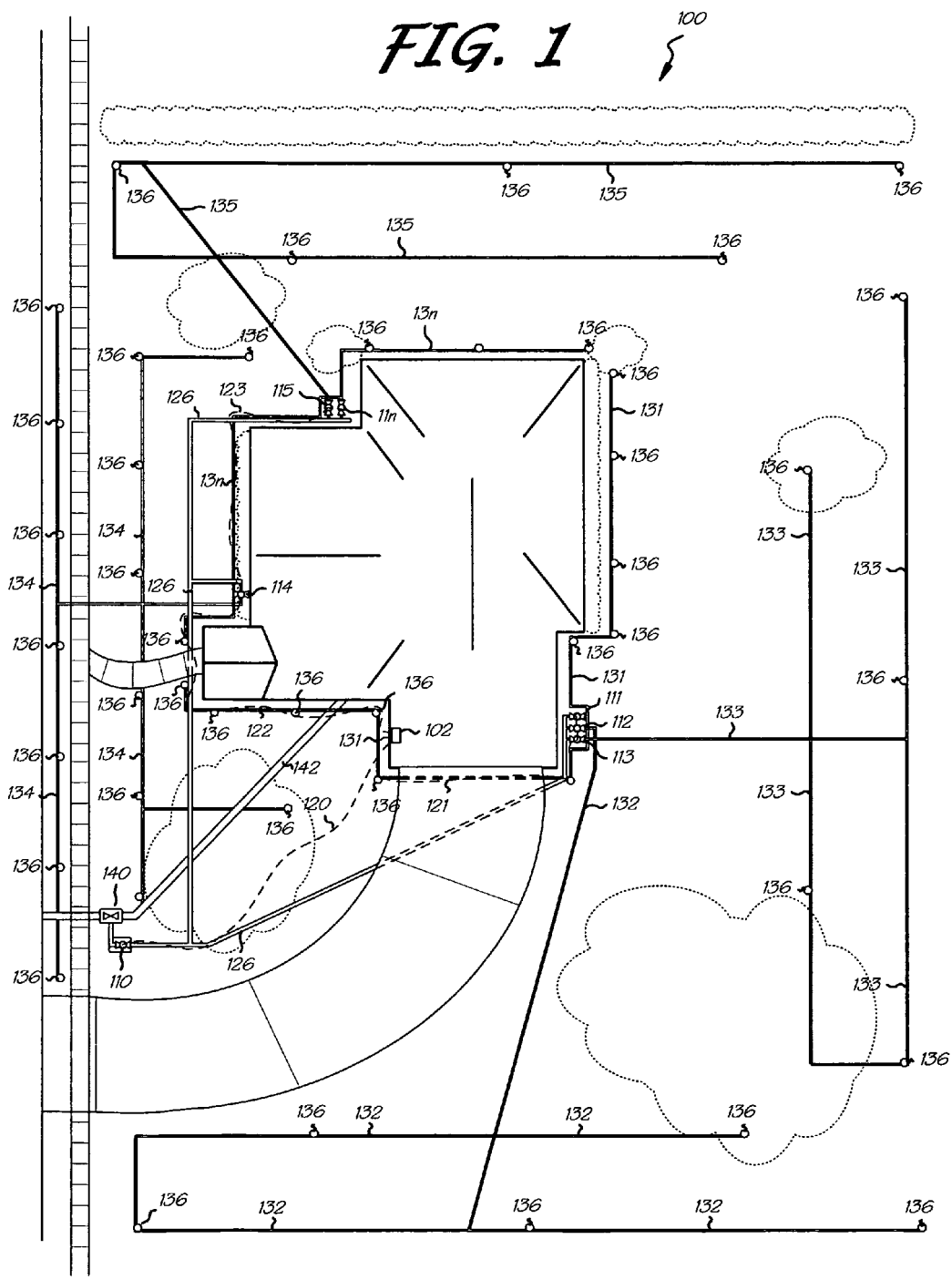

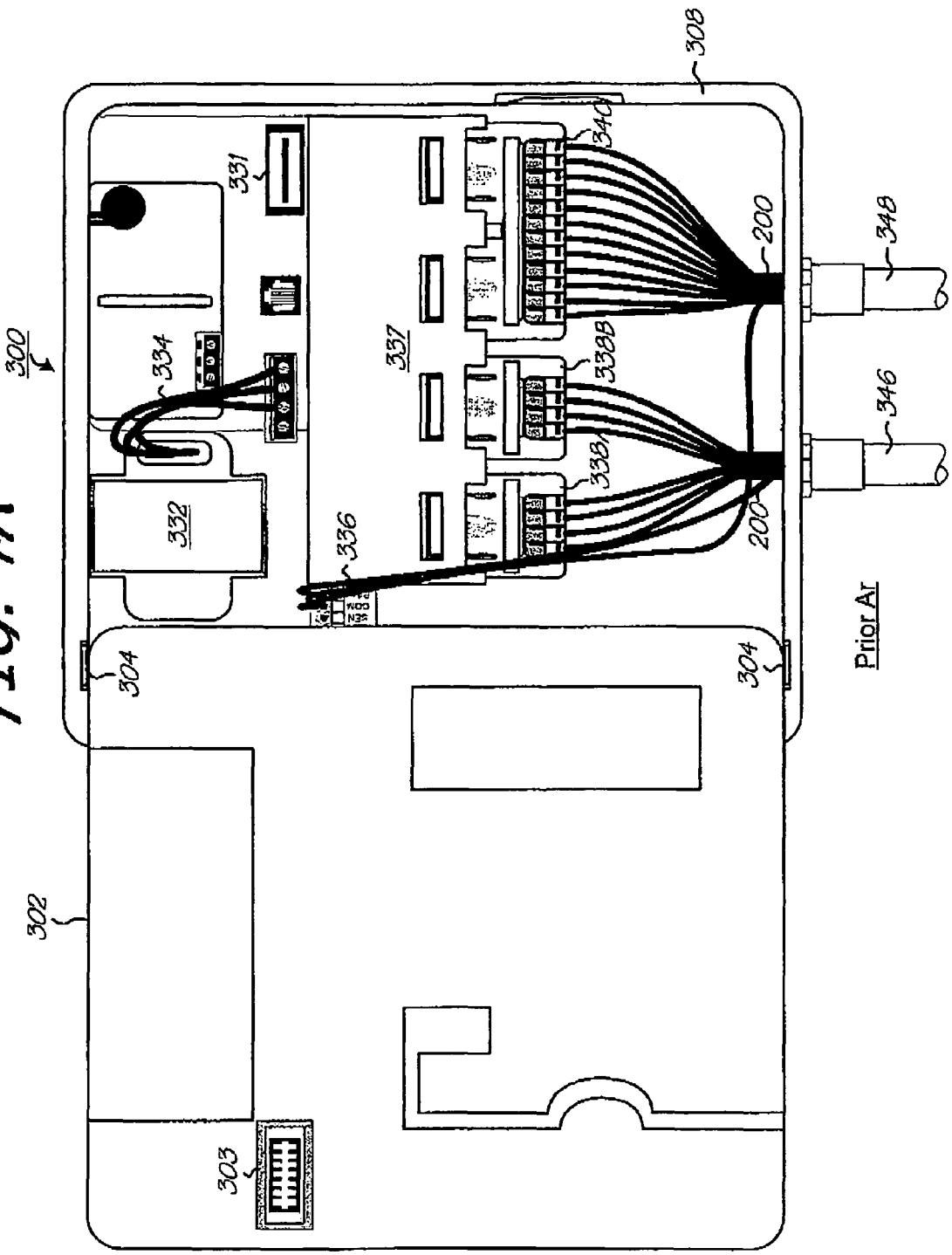

IRRIGATION CONTROLLER WITH INTEGRATED WIRE TRACKER

CROSS-REFERENCE TO RELATED APPLICATIONS

The present application is related to and claims priority to U.S. provisional patent application entitled "Irrigation Controller with Integrated Wire Tracker" having Ser. No. 61/132,312, and filed on Jun. 16, 2008, which is incorporated by reference herein in its entirety.

The present application is related to the following co-pending U.S. patent applications:

U.S. patent entitled, "Irrigation Controller with Integrated Valve Locator", having U.S. Pat. No. 7,406,363, and issued on Jul. 29, 2008 currently pending; and U.S. patent application entitled, "Two-Wire Irrigation Decoder Manager", having application Ser. No. 11/983,086, and filed on Nov. 6, 2007, currently pending;

Each which are assigned to the assignee of the present invention. The above identified applications are incorporated by reference herein in their entirety.

BACKGROUND OF THE INVENTION

1. Field of the Invention

The present invention relates to an irrigation controller. More particularly, the present invention relates to an irrigation controller with integrated wire tracker functionality.

2. Description of Related Art

Conventional automated irrigation systems generally comprise two coextensive physical networks that work in concert for the delivery of water. The first is a water delivery network consisting of a water delivery conduit, (e.g., pipe and/or tubing), metering, regulating and dispersing elements for efficiently regulating the flow of water through the conduit and dispersing water over a predetermined area. These elements may include pumps, boosters, irrigation control valves (such as the Weathermatic® Nitro line of diaphragm actuated valves available from Telsco Industries, Incorporated, in Garland, Tex.) anti-siphon devices, check valves, and various types of water dispersion elements (such as sprinklers, either spray, rotary, drip, bubblers, soaker or misters) for wetting the foliage or surface area with water. At least the conduit, irrigation control valves and certain water dispersion elements are installed below ground, or at least below grade. A conventional irrigation system is divided into discrete irrigation zones (sometimes referred to as stations) and the water flow to each zone is controlled and/or regulated by an irrigation control valve. Each irrigation zone is defined by a plurality of water dispersion elements, each controlled by a separate irrigation control valve, which is coupled in the conduit between the water source and the plurality of water dispersion elements. The conduit and water dispersion elements are installed directly in the ground, but irrigation control valves are protected from the soil by a valve box and cover.

The second network is an electrical control network. The purpose of the electrical control network is to generate control signals and transmit the signals to certain components in the water delivery network. Typically, the electrical control network comprises an irrigation controller for generating the control signals (such as the SmartLine™, Weathermatic® Lawnmate or WeatherMate™ controllers, all available from Telsco Industries, Incorporated), and a transmission medium for propagating the signals to the electrical components in the irrigation system.

Periodically, an irrigation zone may fail to activate due to a fault in the transmission medium for propagating the signals to the electrical components for the zone, the zone's solenoid valve or the irrigation controller. Conventional controller trouble shooting techniques can quickly validate the operability of the controller. However, identifying a fault in the control wires of the transmission medium or solenoid valve is somewhat more complicated. If the solenoid valve is not operable, electronic valve locators are useless as the solenoid cannot be energized into an audible chattering state. Therefore, an operator will often attempt to manually verify the integrity of the control wires for the faulty irrigation zone. Typically, the wires are disconnected from the controller and then electrical continuity and isolation checks are made on the control circuit using a standard multi-meter. Open circuit conditions are relatively easy to identify as the control wire circuit will exhibit a relatively high impedance. Short circuit conditions are more difficult to diagnose because the impedance of a shorted control wire circuit may approximate a good control wire circuit coupled to a solenoid. Moreover, even if the fault is properly diagnosed as a faulty control wire, conventional diagnostic techniques cannot identify the exact location of the fault in the wire.

Often, during the installation of an irrigation system, the installers will create a surface map of the irrigation system. The map shows the layout of the pipes, sprinklers and valves for each irrigation zone, with reference to fixed objects and the topography of the landscape. The operator may then update the irrigation map to incorporate the locations of plants, shrubs, trees and other foliage. With such a map, the operator will have a good approximation of the location for the control wires leading to each valve in the system; from which the operator may begin to inspect the surface area for obvious indications of a potential interruption, e.g. the placement of new trees or shrubbery over the wire, a new conduit routed across the path of the control wire. etc.

BRIEF SUMMARY OF THE INVENTION

The present invention is directed to an irrigation controller, method and software program product for generating wire tracker signal transmission across a control wire. The irrigation controller includes a valve actuation control module selectively coupled to each of a plurality of control wires and generating a valve actuation control signal thereon. The valve actuation control signal is a continuous control voltage over a plurality of control signal periods for selectively energizing the selected irrigation valve. Also integrated in the irrigation controller is a wire tracker transmitter module for selectively coupling to each of a plurality of control wires and generating a transmission signal that can be received at a mobile receiver.

BRIEF DESCRIPTION OF THE SEVERAL VIEWS OF THE DRAWINGS

The novel features believed characteristic of the present invention are set forth in the appended claims. The invention itself, however, as well as a preferred mode of use, further objectives and advantages thereof, will be best understood by reference to the following detailed description of an illustrative embodiment when read in conjunction with the accompanying drawings wherein:

FIG. 1 is a diagram illustrating a typical layout of an automated irrigation system in accordance with an exemplary embodiment of the present invention;

FIG. 4A is an illustration of legacy irrigation controller 300 in the opened position as known in the prior art;

DETAILED DESCRIPTION OF THE INVENTION

Figure 2A:
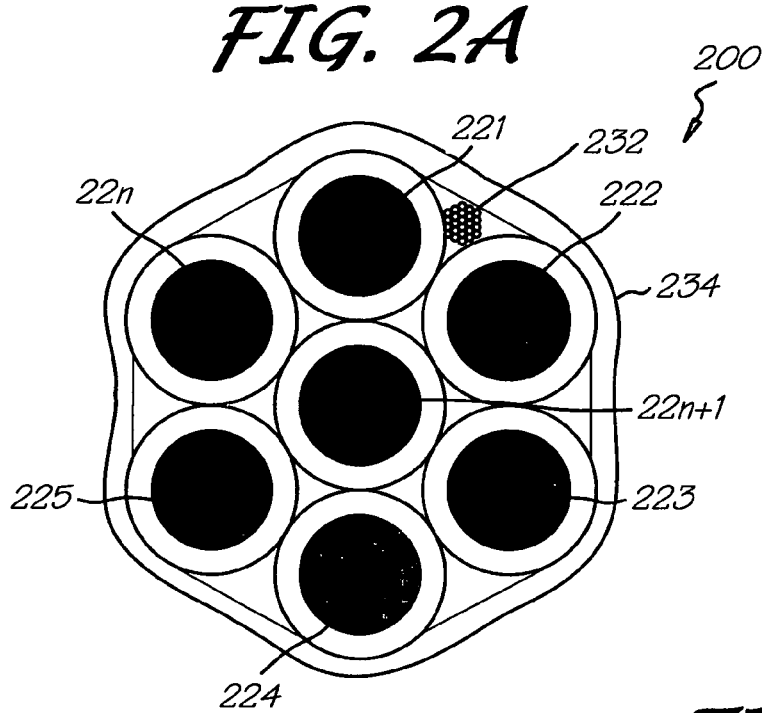
FIGS. 2A and 2B are cross-sectional diagrams of a control wire typically used in the irrigation industry.

| Element Reference Number Designations |
|---|
| 100: Automated irrigation system |
| 102: Irrigation controller |
| 110: Master Valve |
| 111: Solenoid valve zone 1 |
| 112: Solenoid valve zone 2 |
| 113: Solenoid valve zone 3 |
| 114: Solenoid valve zone 4 |
| 115: Solenoid valve zone 5 |
| 11n: Solenoid valve zone n |
| 120: Master valve control wire |
| 121: Solenoid valve control wire |
| 122: Solenoid valve control wire |
| 122: Solenoid valve control wire |
| 126: Irrigation supply conduit |
| 131: Irrigation conduit zone 1 |
| 132: Irrigation conduit zone 2 |
| 133: Irrigation conduit zone 3 |
| 134: Irrigation conduit zone 4 |
| 135: Irrigation conduit zone 5 |
| 13n: Irrigation conduit zone n |
| 136: Water dispersion elements (sprinklers) |
| 140: Water supply |
| 142: Water supply conduit |
| 200: Multi-conductor control wire |
| 202: Two-conductor control wire |
| 221: Conductor 1 |
| 222: Conductor 2 |
| 223: Conductor 3 |
| 224: Conductor 4 |
| 225: Conductor 5 |
| 22n: Conductor n |
| 22n + 1: Conductor n + 1 |
| 232: Tensile cord |
| 234: Direct burial jacket |
| 300: Irrigation controller |
| 302: Front panel |
| 303: Plug |
| 304: Hinges |
| 306: Back side |
| 308: Weatherproof cabinet |

| Element Reference Number Designations |
|---|
| 310: Display |
| 322: Buttons |
| 324: Buttons |
| 326: Knobs |
| 331: Receptacle |
| 336: Master valve circuit |
| 337: Internal buss |
| 338A: Four-station expansion module |
| 338B: Four-station expansion module |
| 340: Eight-station expansion module |
| 346: Wire conduit |
| 348: Wire conduit |
| 350: Decoder manager module |
| 400: Legacy controller with Two-wire module |
| 460: Display |
| 462: Indicator light |
| 463: Dual color LED |
| 464: LED |
| 465: Retainer clip |
| 470: User interface |
| 471: Button |
| 472: Button |
| 474: Button |
| 480: Programming port |
| 482: Master valve terminals |
| 484: Auxiliary terminals |
| 486: Control wire terminals |
| 502: Irrigation controller |
| 502: |
| 512: Microprocessor |
| 514: Memory (ROM/PROM) |
| 516: Memory (RAM) |
| 518: Address Buss |
| 520: Data Buss |
| 532: Serial communications port |
| 546: User interface |
| 548: I/O interface |
| 550: Display |
| 552: Clock |
| 553: Terminal block |
| 554: Control wire terminals |
| 556: Sensors |
| 556(1): Moisture sensor |
| 556(2): Rain Sensor |
| 558: Temperature Sensor |
| 560: Remote Interface |
| 570: Valve locator module (circuitry) |
| 580: Wire tracker module (circuitry) |
| 600: Wire tracker circuit |
| 602: Switch |
| 604: Control signal input |
| 606: Transmitter oscillator |
| 608: Variable amplifier |
| 610: Irrigation control wire selector |
| 612: Wire tracker wire selector |
| 614: Ground |
| 700: Mobile receiver wand |
| 702: Handle |
| 704: Receiver electronics |
| 706: Visual signal strength meter (analog display) |
| 708: Audible signal strength meter (speaker, headset) |
| 710: Receiver wand |
| 800: Signal strength representation |
| 802: Subterranean control cable |
| 810: Signal strength representation (conductor leak) |
| 812: Electrical leak |
| 820: Signal strength representation (conductor leak) |
| 822: Electrical open (cable break) |
| 830: Signal strength representation (conductor leak) |
| 832: Solenoid valve |

In the following description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following description is, therefore, not to be taken in a limiting sense. For clarity of exposition, like features shown in the accompanying drawings are indicated with like reference numerals and similar features as shown in alternate embodiments in the drawings are indicated with similar reference numerals.

Conventional automated irrigation systems generally comprise two separate physical networks that work in concert for the delivery of water. FIG. 1 is a diagram illustrating a typical layout of an automated irrigation system in accordance with an exemplary embodiment of the present invention. A typical property with automated irrigation system 100 receives water from a water supply 140 which may be a well or, as depicted, a municipal water source. In this case, the municipal water supply may supply irrigation water needs through optional master valve 110 via supply conduit 126 and non-irrigation water needs through conduit 142. Irrigation system 100 is subdivided into n separate irrigation zones. At the control point for each irrigation zone is a solenoid activation valve (depicted in the figure as valves 111 through 11n). On the controlled side of each of the n irrigation valves is an irrigation line (depicted in the figure as irrigation lines 111 through 11n), coupled to each is one or more water dispersion elements (sprinklers) 136. Each of valves 111-11n regulates water from conduit 126 based on control signals received from one a plurality of control wires (depicted in the figure as control wires 121 through 123). Additionally, control wire 120 is routed to master valve 110.

Each of valves 111-11n is connected between the water delivery network and the electrical control network. Water supply 140 produces pressurized water that is fed into pipes 126, which are connected through valves 111-11n, and onto water dispersion elements (sprinklers) 136. Each set of irrigation control valve 111-11n and associated water dispersion elements (sprinklers) 136 defines a particular irrigation zone (such as irrigation zones 1, 2, 3, ... n). Valves 111-11n receive a control signal from irrigation controller 102, via control wires 121 through 123. In many applications, the signal received by valves 111-11n is a change in voltage level (or more correctly, a change in the current resulting from a voltage change applied across the control wires). This control signal is generated by irrigation controller 102. A single irrigation controller can control 6, 12, 25 or 46 irrigation zones or more. Irrigation controllers, and the operation of which, may be generally understood from the disclosure of U.S. Pat. No. 6,314,340, issued to Mecham, et al., on Nov. 6, 2001, which is incorporated herein by reference in its entirety.

Figure 2B:
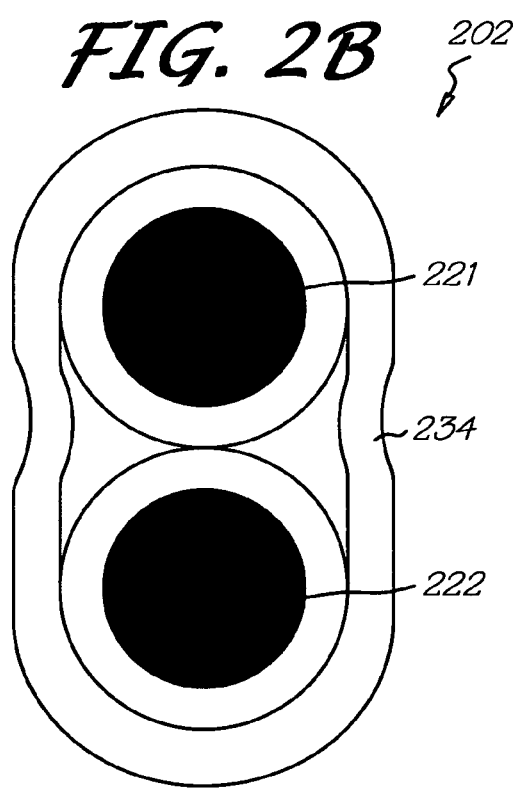

FIGS. 2A and 2B are cross-sectional diagrams of a control wire typically used in the irrigation industry. FIG. 2A is a cross-section of a multi-conductor wire conductor. Multi-conductor control wire 200 typically comprises a tough, leak resistant direct burial jacket 234, and an optional inner liner (not shown), with n+1 insulated conductors of 12 awg to 20 awg (American Wire Gauge) contained within jacket 234 with optional tensile cord 232. The n conductors are usually multistrand copper. FIG. 2B is a cross-section of a two-wire conductor. Typically, conductors 221-22n are used as conductors for n irrigation zones and conductor 22n+1 is a common return. Two-conductor control wire 202 is similar in construction to multi-conductor control wire 200 with leak resistant direct burial jacket 234, an optional inner liner (not shown), and two insulated conductors of 10 awg to 16 awg conductors contained within jacket 234. Insulated conductors 221 and 222 are usually multistrand copper, but typically heavier gauge than multi-conductor control wire 200.

As may be appreciated from the diagram of FIG. 1, if a fault occurs on one control wires 120 through 123, knowing the exact placement of that wire is necessary to affect a repair. Furthermore, identifying the exact position of the fault within the length of the control wire is important for affecting a localized fix rather than replacing the entire cable run.

Figure 3:
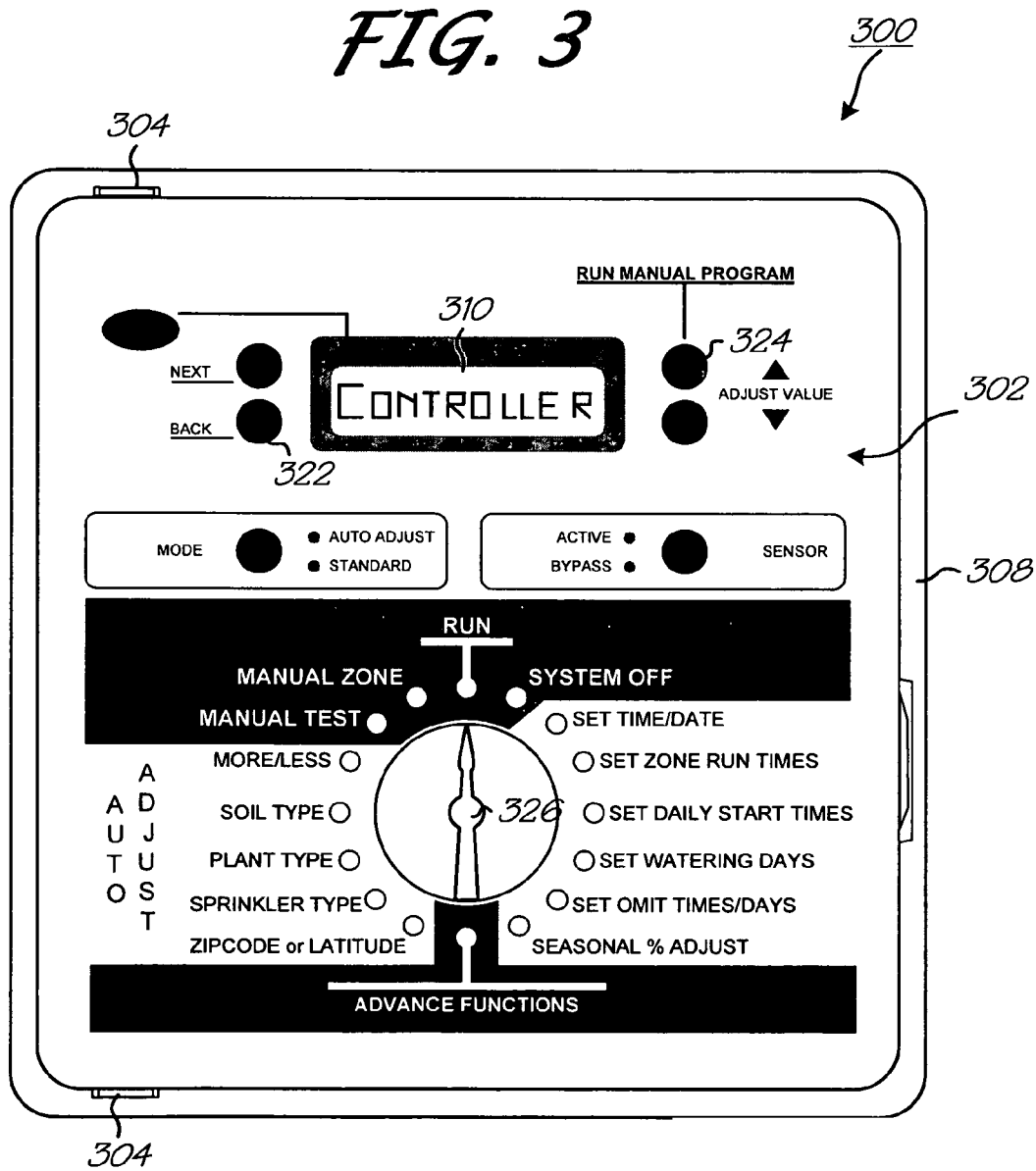
FIG. 3 is an illustration of the face of a legacy irrigation controller as known in the prior art as used for multi-wire irrigation systems in which one signal wire is used to control each irrigation station in a multi-wire irrigation system.

FIG. 3 is an illustration of the face of a legacy irrigation controller as known in the prior art as used for multi-wire irrigation systems in which one signal wire is used to control each irrigation station in a multi-wire irrigation system. A multi-wire irrigation system is evident by the number of control wires employed, i.e., a twenty-station irrigation system would require twenty separate conductors to be coupled between an irrigation controller and the solenoid activated irrigation valves, in addition to a return conductor. Front panel 302 of irrigation controller 300 generally comprises a user interface, such as knobs 326, buttons 322, 324 and other switches for conveying user interactions to the controller and inputting and selecting various values for settings and/or modifying irrigation schedules. Display 310 allows the user to view entry parameter values, schedules, times, dates, diagnostic and programming information. Such controllers are well known in the irrigation industry, for instance the Smart-Line SL1600 Irrigation Controller (available from and a registered trademark of Telsco Industries Inc. of Garland, Tex.).

FIG. 4A is an illustration of legacy irrigation controller 300 in the opened position as known in the prior art. Here, front panel 302 is opened via hinges 304 revealing the contents of weatherproof cabinet 308 and the back side 306 of front panel 302. Within weatherproof cabinet 308 is step down transformer 332 which converts the 110 VAC into a lower voltage for powering controller 300 for powering the irrigation controller (24 VAC is typical and currently the most popular step down voltage but other voltage levels are possible). The low voltage output 334 powers the processor, clock, expansion modules, valve solenoids and other electrical components that will be described below. Power is transferred from the interior of weatherproof cabinet 308 to the electronic components in hinged front panel 302 by means of plug 303 on panel 302 and corresponding receptacle 331 in weatherproof cabinet 308. Also depicted in cabinet 308 are three expansion modules, two four-station expansion modules 338A and 338B (two sets of four solenoid control wires 200 exit controller housing 308 through conduit 346) and one eight-station expansion module 340 (with eight solenoid control wires 200 exiting controller housing 308 through conduit 348). As may be appreciated, in this exemplary configuration irrigation controller 300 will handle a maximum of sixteen separate irrigation stations, but alternatively may be configured to control from one to sixteen stations depending on the station capacity of the expansion modules that are installed in the controller. In this particular exemplary irrigation controller, all of the higher level electronics are disposed within front panel 302. Thus, irrigation control signals produced in front panel 302 are routed back to the interior of weatherproof cabinet 308 from plug 303 to receptacle 331 and then on to internal buss 337, which is electrically coupled to pins (or other types of electrical connectors) in slots for receiving modules 338A and 338B and 340, and also to master valve circuit 336. In this configuration, each irrigation station that is connected to controller 300 received control signals through one of corresponding expansion modules 338A, 338B and 340 (referred to internally as expansion modules or station modules). Each of expansion modules 338A, 338B and 340 generally comprise a plastic housing that encloses and supports a station module circuit, as well as wire connection terminals for connecting wires to a plurality of solenoid actuated valves.

Internal buss 337 may be configured in a serial buss architecture or parallel buss architecture. In a serial buss architecture, or serial operation, a control signal for activating all stations valves is present on only one signal wire that is electrically coupled to all legacy serial expansion modules present in the controller. If exemplary controller 300 of FIG. 4A is a serial-type irrigation controller, buss 337 will have only a single control wire for providing the control signal to each of the module slots (in practice, there may a single control wire terminated at pins in module slots or a single control wire that is coupled to individual control wires that are themselves terminated at pins in module slots). In any case, a single serial-type expansion module coupled to a serial irrigation controller can control any number of irrigation stations that are supported by the particular controller (often the limiting factor is the physical density of the conductor terminals on the module). In theory, one serial-type expansion module inserted in the first module slot of the controller could control all of the irrigation station supported by the irrigation controller. This is possible because the control signals generated by the irrigation controller are decoded by a shift register, or the like, disposed within each legacy serial-type expansion module, and the decoded control signals are then used to selectively activate one or more power switching devices that are also disposed within the module. Typical power switching devices include solid state TRIAC devices (TRIode for Alternating Current), but may be any type of switching device for controlling a high current path with a low current control signal. The SmartLine SL1600 family of irrigation controllers employ a serial buss architecture for controlling the irrigation stations.

In a parallel buss architecture, or parallel operation, each control signal for activating each of the station valves is present on only one separate circuit or signal wire, such as that described in U.S. Pat. No. 5,956,248 to Williams, et al. Thus, a parallel-type irrigation controller, that employs a parallel buss architecture, will have one designated control wire for each station under the control of the expansion module within the controller. Accordingly, if exemplary controller 300 of FIG. 4A is a parallel-type irrigation controller, buss 337 will have twenty separate control wires leading to the module slots. In parallel operation, one or more power switching devices (typically disposed within the respective modules) receive a control signal from one of the separate control wires for activating a particular irrigation station valve. Consequently, an expansion module coupled to an irrigation controller utilizing a parallel architecture will only control a number of irrigation stations equal to the number of control leads in contact with the module. Typically in serial operation, as in the parallel module operation discussed above, each parallel-type expansion module circuit includes a plurality of TRIACs or other power switching devices, one switching device for each of the plurality of solenoid actuated station valves controlled by the expansion module.

A competing type of irrigation system to the multi-wire system is known as a two-wire irrigation system (not shown). A two-wire irrigation system is distinguishable from multi-wire irrigation systems, in that only two wires exits the irrigation controller to control all of the irrigation stations in the irrigation system, i.e., only a pair of wire, signal wire and a return, is routed to each irrigation valve box (activation power is provided simultaneously across the two wires with the control signals. However, briefly, the difference between the multi-wire and two-wire schemes is that in the multi-wire scheme, each solenoid valve is electrically coupled directly to one of the expansion modules of the irrigation controller and responds to a power signal on that control wire. In the two-wire system, on the other hand, each solenoid valve receives its power signal from a decoder which is electrically coupled between the solenoid valve and a two-wire expansion module on a pair of control wires. The decoder receives and responds to control messages that are transmitted simultaneously with a continuous power signal. A novel two-wire expansion module which operates as a decoder manager is disclosed herein.

Figure 4B:
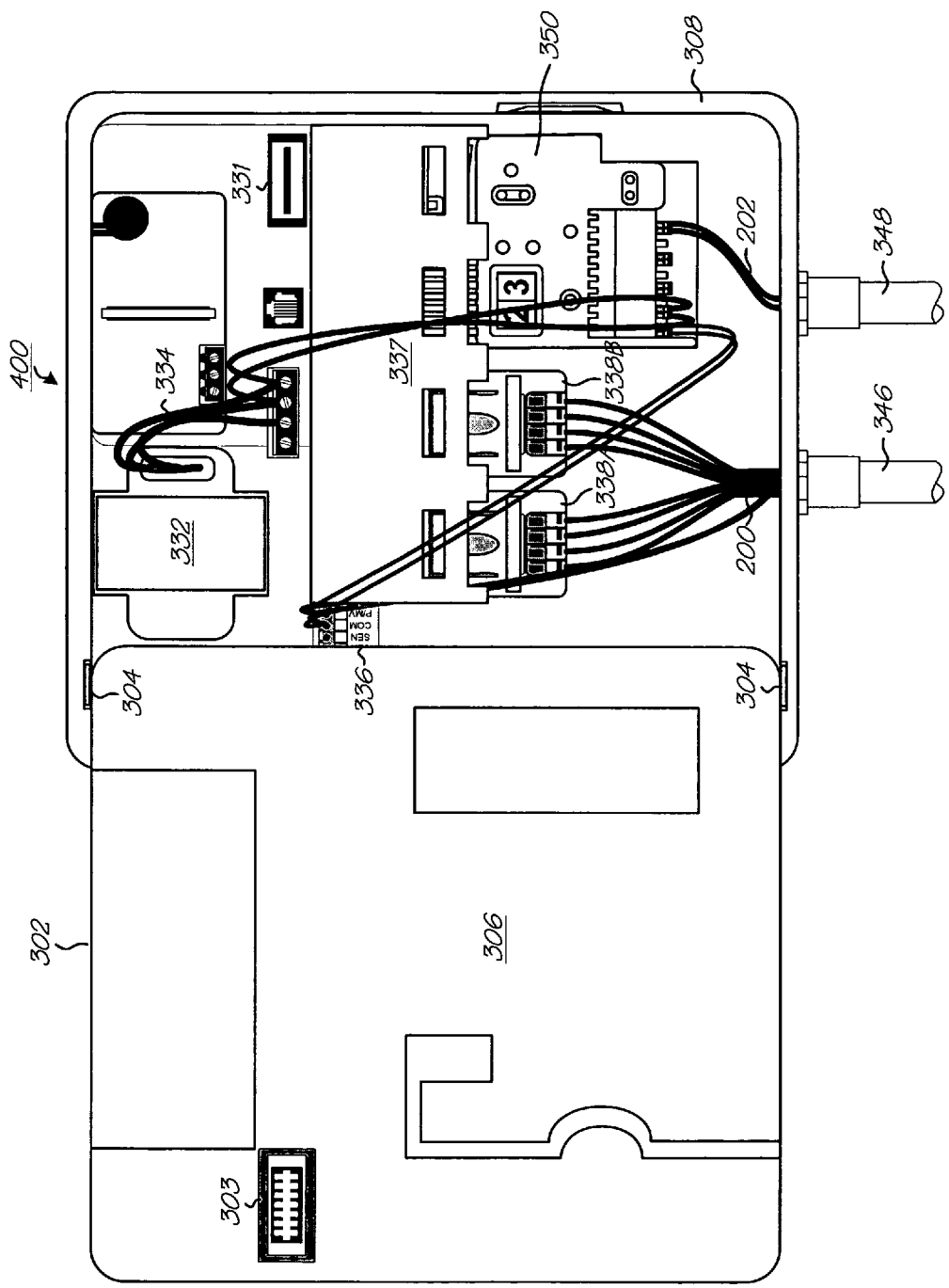
FIG. 4B shows a decoder manager module installed inside a legacy irrigation controller alongside two legacy four-station expansion modules.
Figure 4C:
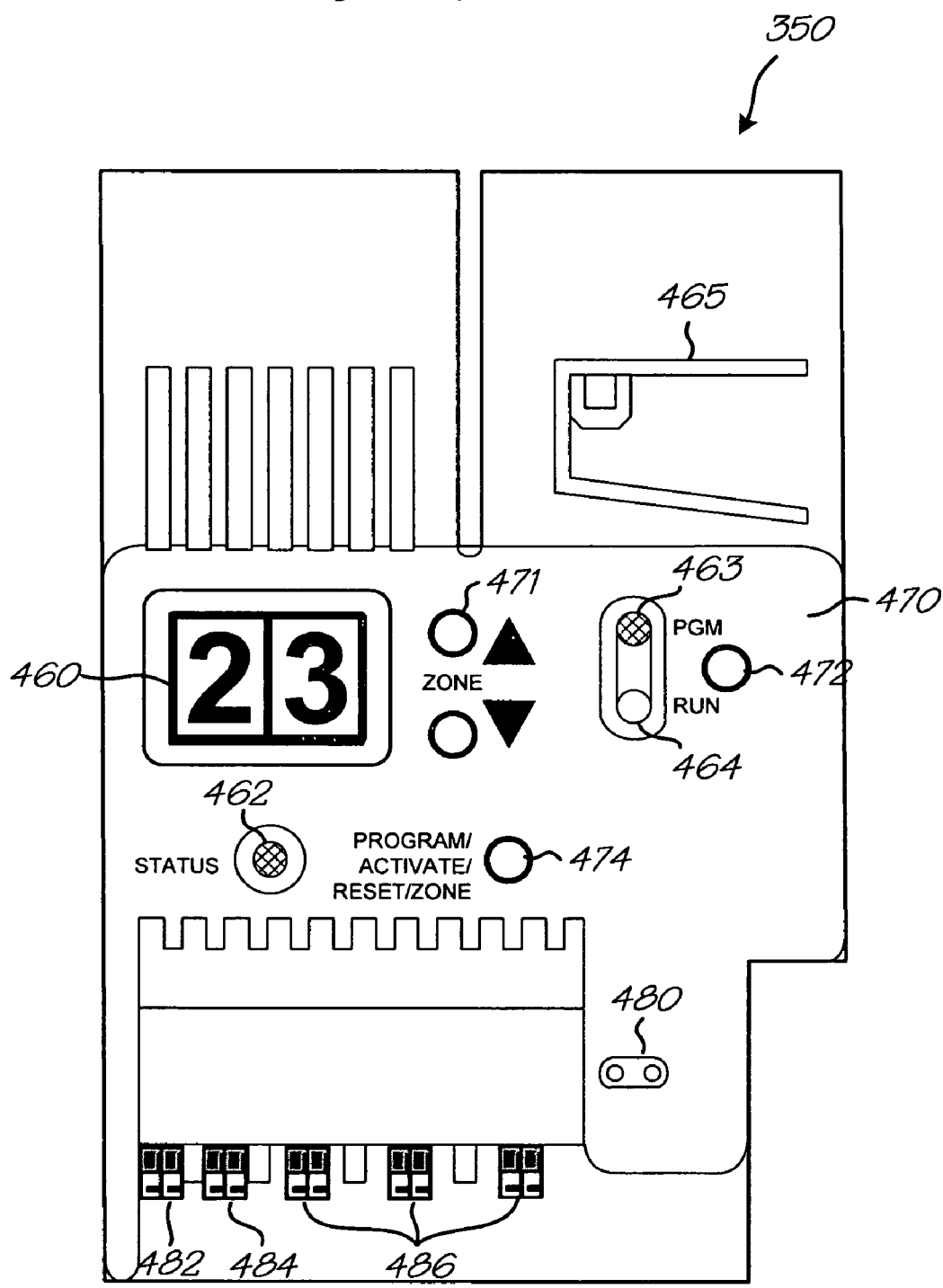
FIG. 4C is an illustration of an m-zone, two-wire decoder manager in accordance with an exemplary embodiment of the present invention which may be used in conjunction with conventional multi-wire expansion modules as depicted in FIG. 4B.

FIG. 4C is an illustration of an m-zone, two-wire decoder manager in accordance with an exemplary embodiment of the present invention which may be used in conjunction with conventional multi-wire expansion modules as depicted in FIG. 4B. FIG. 4B shows decoder manager module 350 installed inside legacy irrigation controller 400 alongside two legacy four-station expansion modules 338A and 338B. Conventional expansion modules 338A, 338B and 340 can be used side-by-side with the present two-wire decoder-manager module 350. Typically, prior art controllers operate on either the multi-wire principle or the two-wire principle. Thus in accordance with the prior art, multi-wire expansion modules are not compatible with two-wire controllers and two-wire modules are not compatible with multi-wire controllers. One benefit of the present m-zone, two-wire decoder manager is that it is compatible with legacy multi-wire controllers, moreover, the present m-zone, two-wire decoder manager may be configured for either a parallel buss architecture controller or a serial buss architecture controller. More importantly, the present m-zone, two-wire decoder manager is invisible to the controller as it responds to the native control signals generated in a legacy irrigation controller exactly as the legacy expansion modules respond. Thus, legacy irrigation controller 400 is programmed by the user identically whether two-wire decoder-manager module 350 is installed in the controller, or legacy expansion modules 338A, 338B and 340, or some combination of a two-wire decoder-manager module 350 and legacy expansion modules 338A, 338B and 340 are installed. Hence, the use of two-wire decoder-manager module 350 does not impact the user's enjoyment of the legacy controller.

As depicted in FIG. 4C, two-wire decoder-manager module 350 has user interface 470 comprising buttons (or switches) 471-474 for setting and controlling its operations. For instance, button 471 controls the "Up/Down" scrolling of the irrigation zones displayed in display 460. Button 472 is a mode selector for toggling between run mode and program mode, and/or between various diagnostic modes. Dual colored LED 463 is used to indicate programming status; green-program successful, and red-programming event unsuccessful. LED 464 is used to indicate the active mode of decoder manager 450. LED 464 may also be a dual colored LED, one color for active or run mode and a second color for inactive, i.e., programming mode, diagnostics mode, fault mode, etc. Switch 474 activates the decoder programming sequence and also is used to reset error codes. Display 460 may have any number of characters, but in the example display 460 is shown as a two-character display with the numeral "23" being displayed. A two-character display may limit the quantity of stations under the control of decoder manager 450 to one-hundred stations since only station addresses between "00" and "99" can be displayed on display 460. Accordingly, display 460 may be an LED or LCD or any other type display. Retainer clip 465 engages a retainer opening on the irrigation controller module slot.

Also shown on decoder manager 350 is a separate and dedicated programming port 480 for the initial programming of the station addresses on the separate decoders to be used in an irrigation system. Prior to installation at the valve box, each decoder is connected to port 480 for programming unique station addresses. In a typical valve box with an m-station, two-wire decoder, m irrigation valves are connected to water supply manifold 126 and a four-station decoder (not shown) is electrically coupled between two-wire control wire 202 and each of the electrical solenoids on irrigation valves. A decoder is installed at each valve box for decoding message signals from the irrigation controller and activating the irrigation valves on the manifold in that valve box. Although only a four-station decoder is depicted in the figure, a decoder may decode messages for any number of irrigation stations, up to the capacity of the decoder manager, e.g., a one-, two-, four-, six- or eight-station decoder.

Each decoder has a unique serial number and address which identifies it to two-wire decoder manager 350 while installed on irrigation controller 300. All the decoders on the two-wire system "decode" messages transmitted on the two-wires from the controller, but only the appropriate decoder responds and activates/deactivates the attached irrigation valve. When a message is received from two-wire decoder manager 350 and decoded, a decoder responds back to two-wire decoder manager 350 with a status message. As is well understood in the art, conventional two-wire station decoders are available in a variety of station configurations: one, two, four, six, eight, ten, twelve and so on, with one output control wire for each irrigation station and a common return wire. Each station under the control of a decoder must be assigned a unique station address. Accordingly, legacy two-wire decoders also contain a non-volatile internal address memory, i.e., capable of retaining one station address for each output control wire configured on the decoder. Thus, a four-station decoder will have the capacity for storing up to four separate and unique station addresses.

Two-wire decoder-manager module 350 may receive its power from the serial output buss of legacy controller 300 or alternatively may receive its power separately from power transformer 332 at terminal 484. Also, the legacy master valve circuit 336 may be separately routed to decoder-manager module 350 at terminal 482 and mapped to a dedicated master valve decoder address, such as address 099. Two-conductor control wires are coupled to decoder-manager module 350 at any of terminals 486.

Figure 5:
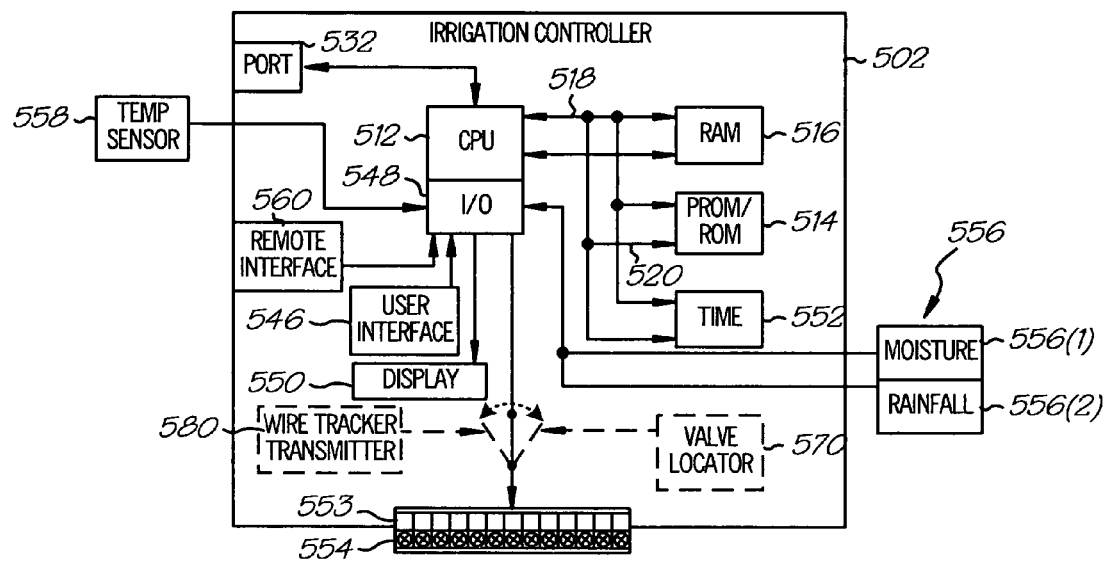
FIG. 5 is a block diagram of irrigation controller 502 in accordance with an exemplary embodiment of the present invention.

FIG. 5 is a block diagram of irrigation controller 502 in accordance with an exemplary embodiment of the present invention. Irrigation system 500 comprises at least irrigation controller 502 and optionally, may further comprise other control components such as one or more evapotranspiration module (not shown) and/or remote controller 562. Some aspects of irrigation controller 502 function generally in the same manner as a conventional irrigation controller. In this regard, an irrigation schedule is programmed into irrigation controller 502 by an operator which specifies not only the day and time of day when irrigation should occur, but also the run time for irrigation in each zone (or program). Irrigation controller 502 then operates to keep track of the irrigation schedule and control the actuation of irrigation control valves 111-11$n$ in accordance with that schedule for the operator specified run time.

An irrigation schedule is programmed into the irrigation controller 502 by the operator which specifies the day and time of day when irrigation should occur. In one implementation, the operator need not pre-program any run time, and the controller chooses an appropriate run time. In another implementation, an operator selected run time is modified by the controller calculated run time if the operator makes this selection. As depicted, irrigation controller 502 operates to process temperature data at the site and calculate a reference evapotranspiration value representing the amount of water lost since a last irrigation. When evapotranspiration modules are in place, a separate temperature sensor is connect to each evapotranspiration module which then calculates a separate reference evapotranspiration value at those remote sites. This information is then communicated to irrigation controller 502. In response to receipt of the evapotranspiration information, irrigation controller 502 calculates a run time for each zone (or program), and then operates to control the actuation of irrigation control valves 111-11$n$ in accordance with the irrigation schedule and for the duration of the calculated run time.

Irrigation controller 502 includes microprocessor (Main CPU) 512, programmable read only memory (ROM/PROM) 514 and random access memory (RAM) 516. ROM/PROM 514 provides a non-volatile storage location for the programming code of the irrigation controller along with certain important (permanent) data necessary for execution of the code. RAM 516 provides a volatile storage location for certain (variable/temporary) data generated during execution of the programming code. Microprocessor 512 communicates with ROM/PROM 514 and RAM 516 in a conventional manner utilizing address buss 518 and data buss 520. It will be understood that ROM/PROM 514 and RAM 516 may be incorporated within or provided separate and apart from microprocessor 512.

The evapotranspiration module also includes a microprocessor connected to a programmable read only memory (ROM/PROM) and a random access memory (RAM), and functions in a similar manner to the irrigation controller. The ROM/PROM provides a non-volatile storage location for the programming code of the watering time determination module along with certain important (permanent) data necessary for execution of the code. The RAM provides a volatile storage location for certain (variable/temporary) data generated during execution of the programming code, wherein the microprocessor communicates with the ROM/PROM and RAM utilizing an address buss and a data bus.

Communication between wired external devices is achieved using serial communications port 532, which is connected to (or is incorporated in) the microprocessor 512 to support communications between the irrigation controller 502 and external devices such as an evapotranspiration module(s), a portable flash memory drive (not shown), or a personal/laptop computer (not shown). Similarly, a second communications port is connected to (or is incorporated in) any external device or module to be connected to irrigation controller 502.

User interface 546 for supporting data entry into controller 502 is connected to microprocessor 512 through I/O interface 548. Input data may, if necessary, be stored in RAM 516. Furthermore, using serial communications link 536, user interface 546 input data may be communicated to an evapotranspiration module for storage in its onboard RAM. The kinds of data input into irrigation controller 502, and perhaps communicated to the evapotranspiration module include: a preferred time of day when irrigation (if necessary) is to be effectuated; a preferred day (or days) of the week when irrigation (if necessary) is to be effectuated; an identification of soil type for the irrigated area; an identification of the vegetation type (crop coefficient); irrigation system 500 site latitude; sprinkler flow rates; soil slope; and, a local irrigation adjustment factor. User interface 546 may further be utilized to initiate certain microprocessor 512 and controller 502 activities (such as, for example, manual zone selection and/or irrigation, a self test, or the like) without regard to the current state of programming code execution.

Optionally, remote controller 562 may be used by the operator for communications with controller 502 from a remote location. Communication between remote controller 562 and irrigation controller 502 is accomplished using over-the-air RF (radio frequency) signals generated in remote interface 560 that are received by irrigation controller interface 564 (for unidirectional communication). It is anticipated that remote controller 562 will operate as an auxiliary external device and not as a substitute for user interface 546 on irrigation controller 502. Therefore, only uni-directional transmission to irrigation controller 502 is expected, although bi-directional communication may also be supported in both remote interface 560 and irrigation controller interface 564.

Display 550 (such as an LCD display) for supporting visual data presentation by irrigation controller 502 is also connected through I/O interface 548 to microprocessor 512. Through display 550, irrigation controller 502 may present information to the operator (such as time, day and date information). Display 550 may further be utilized by microprocessor 512 to present a variety of menus for operator consideration when entering data into irrigation controller 502 and evapotranspiration module, or inform the operator concerning the errors, status or the state of controller operation.

A time of day clock 552 is connected to microprocessor 512 through address buss 518 and data buss 520. This clock 552 maintains a non-volatile record of month, day, hour of the day, minutes of the hour and seconds of the minute. Clock 552 time data is monitored by microprocessor 512 with the time data driving certain operations by irrigation controller 502 and an evapotranspiration module in accordance with their programming codes. These operations include: reading and storing temperature data; initiating and stopping irrigation activities; and, performing certain irrigation related calculations.

In accordance with the execution of the programming code, microprocessor 512 outputs irrigation control signals through I/O interface 548 to control the actuation of irrigation control valves 111-11n. These control valves 111-11n operate to either allow or block the passage of water to one or more water dispersion elements 542. Typically, the control signals to valves 111-11n are generated directly from the input power signal by transforming the high voltage line input to a lower voltage control signal. Controller 502 receives input line power (typically from 110 VAC or 220 VAC power at 50 or 60 Hz and having a generally sinusoidal character wave). The high voltage AC is typically transformed to a 24 VAC, approximately, continuous full-wave transformed from the line power. Solenoid activation is accomplished by supplying the control wires 120-123 with the 24 VAC, through a switching device, typically a triac, relay, or mechanical cam-operated switch contacts in irrigation controller 502. Irrigation control wires are connected to controller 502 at terminal block 553 at terminals 554.

Irrigation controller 502 optionally receives input from other sensors 556 through I/O interface 548. An example of such a sensor is moisture sensor 556(1). When the moisture sensor 556(1) detects moisture, this is indicative of a rainfall event. During such a rainfall event, microprocessor 512 suppresses irrigation controller 502 actuation to sprinkle. Another example of such a sensor comprises rainfall gauge 556(2). Using rainfall information collected by rainfall gauge sensor 556(2), microprocessor 512 adjusts (i.e., reduces or suppresses) its programming code calculated irrigation amount of water which is needed to replace water lost through the effects of evapotranspiration. Temperature sensor 558 is further provided and is connected to microprocessor 512 through input/output (I/O) interface 548. In accordance with the operation of the programming code, temperature data collected by sensor 558 is stored by microprocessor 512 in RAM 516. Alternatively, temperature sensor may be coupled to each evapotranspiration module connected to irrigation controller 502.

Also included in irrigation controller 502 is integrated valve locator 570, which is described in U.S. patent application Ser. No. 11/202,442 and wire tracking transmitter 580. The presently described integrated wire tracker does not require additional steps of disconnecting or reconnecting control wires to establish continuity to a transmitter. Since the implementation is an integral of the electrical/firmware design of the controller, no separate unit and no establishment of continuity is required to effectuate the valve location function. This implementation is initiated by selecting this particular diagnostic mode through the standard controller user interface, which combines a dial, LCD and buttons. Alternatively, initiation of the wire tracker mode could be reconfigured for one-touch operation by designating a dedicated button on the controller face panel or possibly having a dedicated dial position for the valve locator mode. Wire tracker module 580, or comparable wire tracker circuitry/transmitter, may be integrated directly into irrigation controller 502 as a discrete component which is isolated from the digital components in irrigation controller 502. In accordance with this exemplary embodiment, wire tracker module 580 should be switchably connected between any of control wires 120-123 and an earth ground and may include a separate interface for selecting a control wire for testing (such as buttons and/or dials).

Portable wire tracking devices are known in the prior art for use with irrigation control wires, such as the Tempo 521A Wire & Valve Locator available from the Greenlee Company of Rockford, Ill. Typically, these devices are rather expensive and their use may be hazardous to delicate electronic components in an automated irrigation controller. The transmitter produces high voltages and therefore, before initiating a wire tracking operation, all wires leading to the irrigation controller must be disconnected. In the event that a control wire problem develops, or the location of a subterranean must be identified, these devices are useful. Ordinarily, the operator has identified one conductor for wire tracking (either in a valve locator operation or for troubleshooting a wire fault). Initially, the operator disconnects and labels all control wires to the irrigation controller and connects the suspect conductor to the transmitter of the wire tracker device (typically these are color-coded wire that are terminated with a crocodile clip). The operator drives a conducting stake into the ground and a second conductor, the return, is attached to an earthen ground. Next, the transmitter is energized and the output level is adjusted based on the signal strength recorded at a mobile receiver wand, such as mobile receiver wand 700 discussed below. Longer wire runs will require a higher voltage setting to propagate an adequate transmission signal across the length of the wire run. In certain operations, such as detecting the position of an electrical leak, the output level should be carefully monitored so that a change in the signal strength can be readily detected at the position of the leakage. The subterranean wire is tracked by pointing the wand downward, in the general direction of the buried wire, and then walking around the transmitter. The location of the buried wire will be indicated by the absence of signal strength at that location, referred to as a "null" condition where signal strength indicators (visual or audible) drop. From that point, the operator waives the wand across the suspected wire path and follows the null indication to the valve location. Electrical leaks, opens and broken wires can be tracked similarly. Subsequent to the operation, the faulty portion of the control wire may be repaired and the control wires reconnected and proper operation of the irrigation system verified.

While using a prior art portable wire tracking transmitter is useful, it is also cumbersome. The transmitter emits a high voltage signal, that may damage the irrigation controller. Furthermore, sites where the irrigation controller is located indoors are problematic because of the distance to a reliable ground. Furthermore, much of the expense in the wire tracker transmitter is a result of it portability. The portable receiver wand is relatively inexpensive in comparison to the transmitter. What is needed is a reliable wire tracker transmitter that can be safely integrated within an irrigation controller.

Figure 6:
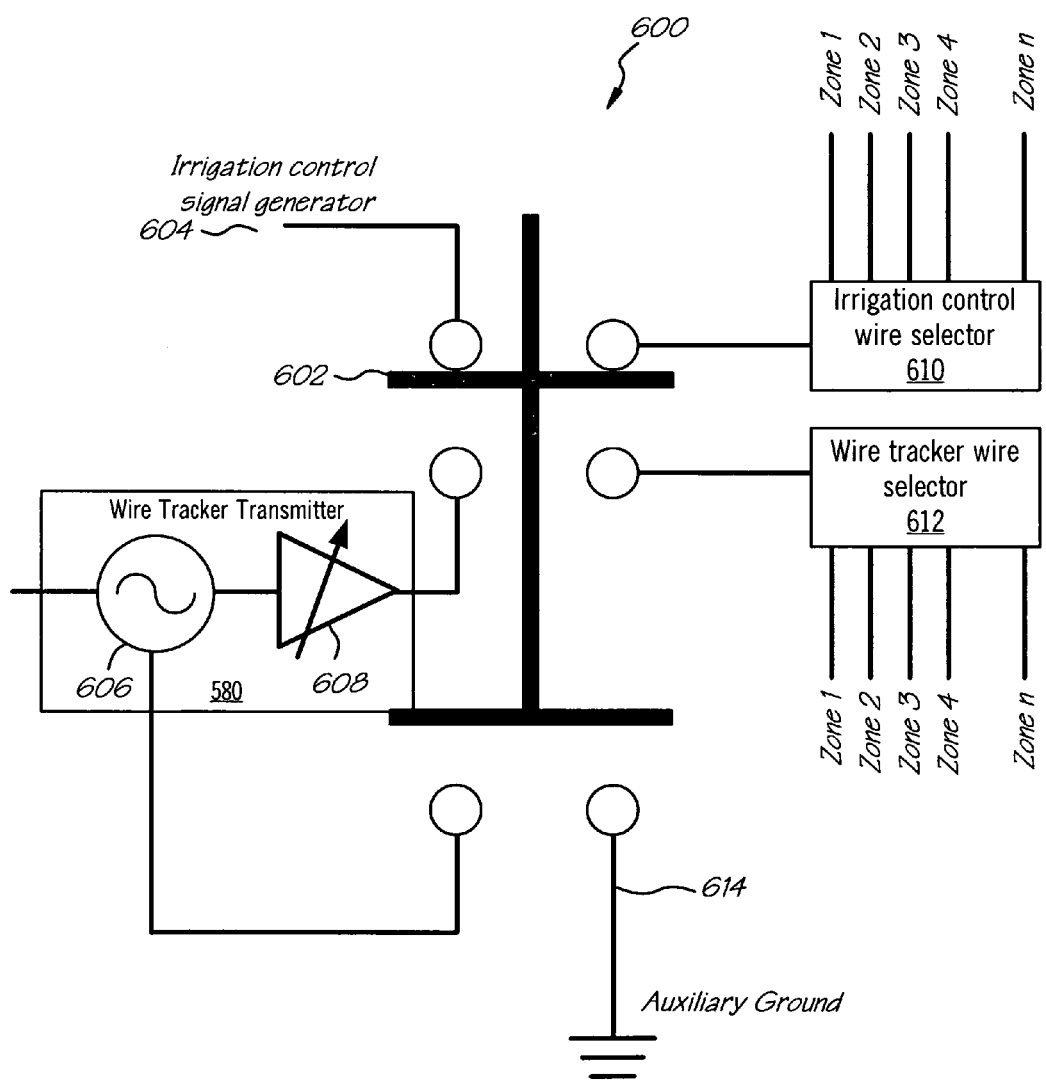
FIG. 6 is a diagram of a wire tracker circuit in accordance with an exemplary embodiment of the present invention.

FIG. 6 is a diagram of a wire tracker circuit integrated in an irrigation controller in accordance with an exemplary embodiment of the present invention. Before discussing the circuit, it should be mentioned that wire tracker circuit 600 may be disposed on any of the irrigation controllers discussed above, i.e., a conventional multi-wire irrigation controller 102 or 300, a two-wire irrigation controller (not shown), a hybrid multi-wire/two-wire controller (not shown), or on decoder manager 350 for converting a conventional multi-wire irrigation controller 400 to a two-wire protocol. The purpose of wire tracker circuit 600 is to enable the operator to selectively transmit an oscillating frequency on any conductor, including the return conductor.

Wire tracker circuit 600 generally comprises normally closed switch 602 that, when activated, safely decouples irrigation control signal input 604 from the control wire, or from irrigation control wire selector 610, while simultaneously coupling wire tracker transmitter 580 between wire tracker wire selector 612 and auxiliary earth ground 614. Normally closed switch 602 ensures that only one signal is transmitted on any of the conductors of the irrigation control wire (such as control wires 120-123 depicted in FIG. 1). Wire tracker transmitter 580 comprises transmitter oscillator 606 that has an operational frequency between 1.2 KHz and 600 KHz and may optionally include variable amplifier 608 to boost the transmitted signal voltage from 24 V p-p to between 100 V p-p and 900 V p-p, for optimizing the transmission signal for a particular installation. Auxiliary ground 614 is generally connected directly to an earthen ground stake driven directly into the soil for a more complete coupling between transmitter 580 and transmission wire.

Figure 7:
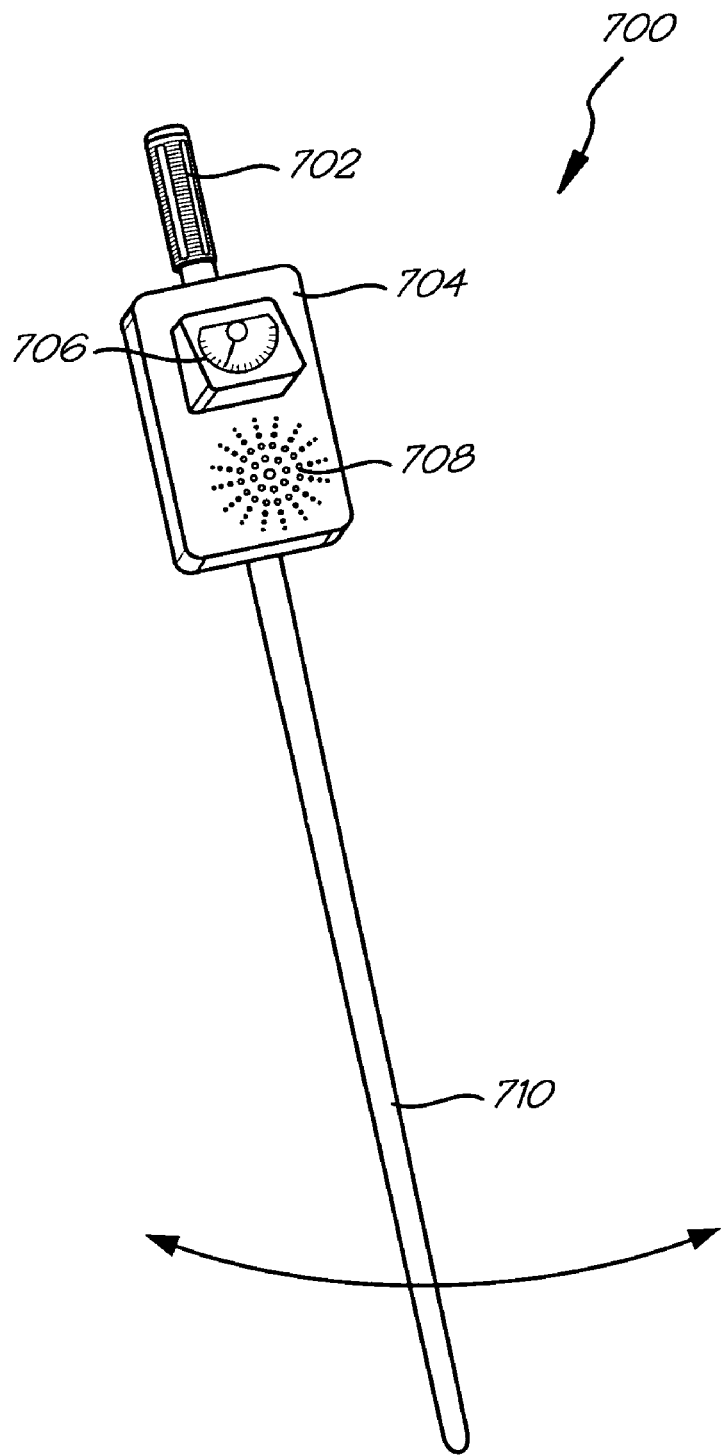
FIG. 7 is a diagram of a mobile receiver wand.

Wire tracker circuit 600 allows the operator to track the path of any selected irrigation wire, from the irrigation controller to each solenoid valve connected in the circuit, in a manner identical to that used in the prior art. More importantly, wire tracker circuit 600 allows the operator to locate valves, electrical opens, electrical leaks, insulation nicks and broken wire, using a mobile receiver wand. FIG. 7 is a diagram of mobile receiver wand 700. Mobile receiver wand 700 generally comprises gripping handle 702, receiving electronics 704 and receiver wand 710 that incorporates an antenna for receiving the transmitter signal through the ground proximate to the buried control wires. The transmitted signal is detected by waving mobile receiver wand 700 laterally across the suspected path of the buried wire. The signal strength received at receiver wand 700 will generally increase as the distance between the wand and wire is reduced and, depending on the receiver, will null at transition between moving toward the wire and away from the wire. The signal may be observed visually using signal strength meter (analog dial) 704, or via audible tone using speaker 708 or a headset (not shown).

Operationally, the transmitter output power is optimized for the site using mobile receiver wand 700. Longer wire runs will require greater power. Next, the operator selects a control wire for tracking, beginning at the controller. Wand 710 portion of mobile receiver wand 700 is moved laterally across the suspected wire path and with a null at the maximum signal strength indicating the topological position of the wire; its position is usually flagged for future reference.

Figure 8A:
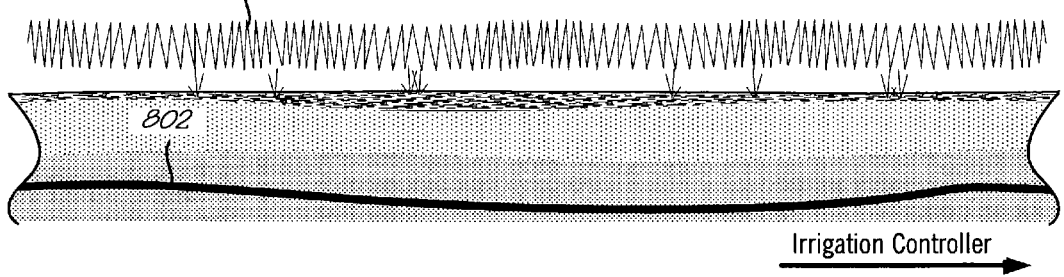
FIGS. 8A, 8B, 8C and 8D are diagrams of common reception patterns at a mobile receiver wand associated various control wire conditions Other features of the present invention will be apparent from the accompanying drawings and from the following detailed description.
Figure 8B:
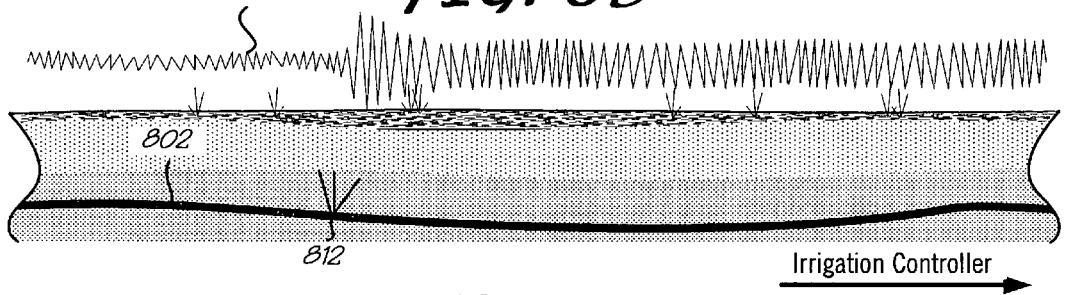
Figure 8C:
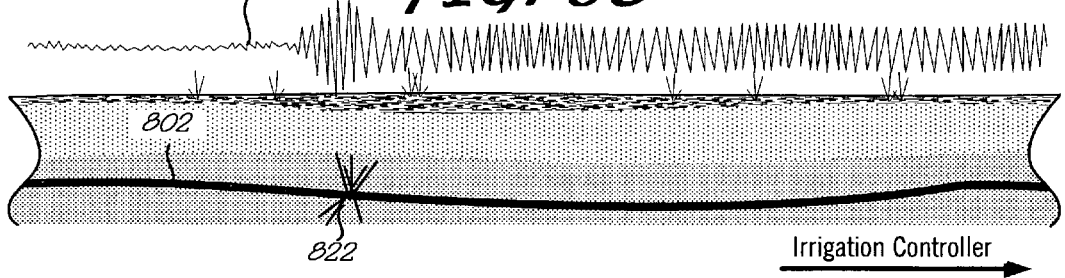
Figure 8D:
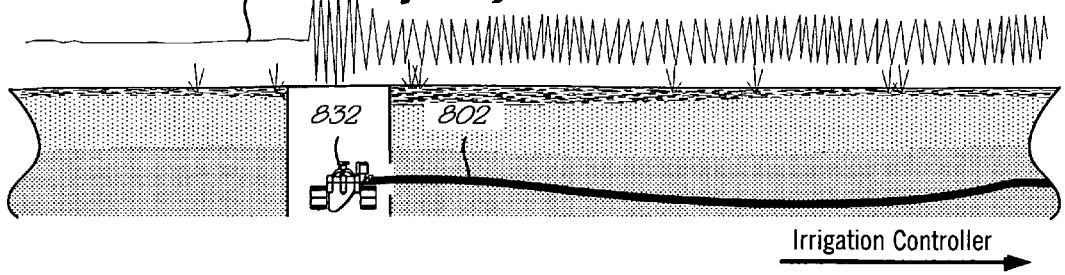

FIGS. 8A-8D are diagrams of common reception patterns associated with various conditions. FIG. 8A illustrates reception pattern 800 for a typical wire tracking operation for wire 802 where no breaks, opens or leaks are found on subterranean irrigation control wire 802. Notice that reception pattern 800, generated at mobile receiver 700, is generally constant across the extent of the cable run. FIG. 8B illustrates reception pattern 810 wherein electrical leak 812 is detected on subterranean irrigation control wire 802. Because control wire 802 is buried, the condition of the cable, as well as its topological location, are not readily observable. The location of any degradation in the cable must be identified or the entire cable run replaced. Notice the signal strength decreases at the leak. Because in this embodiment a change in the level of the signal is sought, often the operator will continually readjust the transmitter strength for various portions of the control wire. FIG. 8C illustrates reception pattern 820 wherein open 822 is detected on wire 802. Here, the absolute value of the transmission strength is far less important as the signal will die out, or be reduced substantially, at the break. Finally, FIG. 8D illustrates reception pattern 830 wherein valve 832 is detected on wire 802. This is a typical reception pattern achieved for valve locator operations.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. The embodiment was chosen and described in order to best explain the principles of the invention and the practical application, and to enable others of ordinary skill in the art to understand the invention for various embodiments with various modifications as are suited to the particular use contemplated.

What is claimed is:

1. An irrigation controller, comprising:
a plurality of control wires;
an auxiliary ground wire;
valve actuation control circuitry for generating a valve actuation control signal on at least a first control wire of the plurality of control wires for specifying a valve actuation period, wherein the valve actuation control signal comprising valve actuation period information for defining a first valve actuation period for a first of a plurality of valves electrically coupled between the first control wire and the auxiliary ground wire;
a valve actuation selector for selecting one of the plurality of valves for actuating with the valve actuation control signal;
wire tracker transmitter circuitry for transmitting a wire tracker signal on one the plurality of control wires, said wire tracker transmitter circuitry comprising:
a signal transmitter for generating the wire tracker signal, wherein the wire tracker signal comprises an oscillating frequency;

a wire tracker control wire selector for selecting one of the plurality of control wires for transmitting the wire tracker signal;

a two-mode switch for, in a first mode, electrically coupling together a first pair of nodes and electrically coupling together a second pair of nodes, the first pair of nodes being electrically isolated from the second pair of nodes, and for electrically isolating from one another a third pair of nodes, and for, in a second mode, electrically isolating from one another the first pair of nodes and for electrically isolating from one another the second pair of nodes and for electrically coupling together the third pair of nodes, the two-mode switch further comprises:

a first electrical connection between a first node of the first pair of nodes and the signal transmitter;

a second electrical connection between a second node of the first pair of nodes and the wire tracker control wire selector;

a third electrical connection between a first conductor in the second pair of nodes and the signal transmitter;

a fourth electrical connection between a second node of the second pair of nodes and the auxiliary ground;

a fifth electrical connection between a first node in the third pair of nodes and the valve actuation control circuitry; and a sixth electrical connection between a second conductor in the third pair of electrical conductors and the valve actuation selector.

2. The controller recited in claim 1 above, wherein the auxiliary ground wire provides a conductive path to an earthen ground.

3. The controller recited in claim 1 above wherein the auxiliary ground wire provides a conductive path to one of a return conductor wire to the one of the plurality of valves and an earthen ground.

4. The controller recited in claim 1 above, wherein the wire tracker signal comprises a carrier frequency of between 1.2 KHz and 600 KHz.

5. The controller recited in claim 1 above, wherein the wire tracker signal comprises a carrier frequency of between 1.2 KHz and 600 KHz.

6. The controller recited in claim 1 above, wherein the controller is a multi-wire irrigation controller and the valve actuation selector is a power switching device.

7. The controller recited in claim 1 above, wherein the controller is a two-wire irrigation controller and the valve actuation selector is a decoder manager.

8. The controller recited in claim 1 above, wherein the controller is a hybrid irrigation controller and the valve actuation selector comprises a decoder manager and a power switching device.

9. The controller recited in claim 1 above, further comprising:

a decoder manager, wherein the signal transmitter is disposed on the decoder manager.

10. The controller recited in claim 3 above, wherein the signal transmitter is disposed in the decoder manager.

11. The controller recited in claim 2 above, wherein the signal transmitter further comprises:

a variable transmitter for operating between 1.2 KHz and 600 KHz.

12. The controller recited in claim 11 above, wherein the signal transmitter further comprises:

a variable amplifier for operating between 100 V p-p and 900 V p-p.

13. The controller recited in claim 1 above, further comprises:

a bus for electrically coupling the valve actuation control circuitry with the a valve actuation selector, wherein the fifth electrical connection of the two-mode switch is electrically coupled to the bus and the sixth electrical connection of the two-mode switch is electrically coupled to the bus.

14. An irrigation controller, comprising:

a controller power supply for providing electrical power for operating the irrigation controller;

valve actuation control circuitry for receiving electrical power from the controller power supply and providing one of a valve actuation control signal and valve actuation power to at least one of a plurality of irrigation valves;

a plurality of control wire terminals electrically coupled to a plurality of irrigation control wires, each of the plurality of control wire terminals electrically coupled to at least one of the plurality of irrigation valves through at least one of the plurality of irrigation control wires;

an auxiliary ground for providing a conductive path from the irrigation controller to an earthen ground;

wire tracker transmitter circuitry for receiving electrical power from the controller power supply and generating a wire tracking signal;

a conductor selection switch electrically coupled to the wire tracker transmitter circuitry for selecting one of the plurality of control wire terminals for providing the wire tracking signal; and a two-mode switch for selectively electrically coupling the valve actuation control circuitry to a selected first of the plurality of control wire terminals for providing one of the valve actuation control signal and the valve actuation power to at least one of the plurality of irrigation valves on the selected first of the plurality of control wire terminals and, electrically isolating the wire tracker transmitter circuitry from the selected first of the plurality of control wire terminals, and, alternatively selectively electrically coupling the wire tracker transmitter circuitry to the both the selected first of the plurality of control wire terminals and the auxiliary ground for providing wire tracking signal for providing the wire tracking signal a first irrigation control wire of the plurality of irrigation control wires electrically coupled to the selected first of the plurality of control wire terminals, and electrically isolating the valve activation control circuitry from the the selected first of the plurality of control wire terminals.

15. The controller recited in claim 1 above, wherein the controller is a modular two-wire irrigation controller and the valve actuation selector is a decoder manager module.

16. The controller recited in claim 1 above, wherein the controller is a modular multi-wire irrigation controller and the valve actuation selector is a power switching device disposed within a multi-station expansion module.

17. The controller recited in claim 1 above, wherein the valve actuation selector is electrically coupled to a CPU for receiving valve actuation selection information.

18. The controller recited in claim 1 above, wherein the valve actuation selector is electrically coupled to a manual interface for receiving manually input valve actuation selection information.

* * * * *